US009235763B2

(12) United States Patent
Joyce et al.

(10) Patent No.: US 9,235,763 B2
(45) Date of Patent: Jan. 12, 2016

(54) INTEGRATED AERIAL PHOTOGRAMMETRY SURVEYS

(71) Applicant: Trimble Navigation Limited, Sunnyvale, CA (US)

(72) Inventors: Kenneth R. Joyce, Denver, CO (US); Troy L. Brown, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 590 days.

(21) Appl. No.: 13/685,375

(22) Filed: Nov. 26, 2012

(65) Prior Publication Data

US 2014/0146173 A1 May 29, 2014

(51) Int. Cl.
*H04N 7/18* (2006.01)
*G06K 9/00* (2006.01)
*G01C 11/04* (2006.01)
*G01C 15/00* (2006.01)

(52) U.S. Cl.
CPC .............. *G06K 9/0063* (2013.01); *G01C 11/04* (2013.01); *G01C 15/00* (2013.01)

(58) Field of Classification Search
CPC ................... B64C 2201/127; B64C 2201/141; B64C 39/024; G01C 11/00; G01C 11/02; G01C 21/32; G01C 21/3407
See application file for complete search history.

(56) References Cited

U.S. PATENT DOCUMENTS

| | | | |
|---|---|---|---|
| 5,077,557 A | 12/1991 | Ingensand | |
| 5,432,712 A | 7/1995 | Chan | |
| 5,512,905 A | 4/1996 | Nichols et al. | |
| 5,642,285 A | 6/1997 | Woo et al. | |
| 6,034,722 A | 3/2000 | Viney et al. | |
| 6,084,510 A * | 7/2000 | Lemelson et al. | 340/539.13 |
| 6,147,598 A | 11/2000 | Murphy et al. | |
| 6,237,235 B1 | 5/2001 | Kaschke et al. | |
| 6,282,362 B1 | 8/2001 | Murphy et al. | |
| 6,859,269 B2 | 2/2005 | Ohtomo et al. | |
| 6,873,407 B2 | 3/2005 | Vogel | |
| 7,145,648 B2 | 12/2006 | Vogel | |
| 7,149,366 B1 * | 12/2006 | Sun | 382/284 |
| 7,339,611 B2 | 3/2008 | Marold et al. | |
| 7,374,140 B2 | 5/2008 | Crain et al. | |

(Continued)

FOREIGN PATENT DOCUMENTS

DE 19922321 C2 7/2002
EP 0391498 A1 10/1990

(Continued)

OTHER PUBLICATIONS

International Search Report and Written Opinion prepared by the European Patent Office as International Searching Authority for PCT International Patent Application No. PCT/US14/43271, mailed Sep. 22, 2014, 9 pages.

(Continued)

*Primary Examiner* — Victor Kostak
(74) *Attorney, Agent, or Firm* — Swanson & Bratschun, L.L.C.

(57) ABSTRACT

Novel tools and techniques for generating survey data about a survey site. Aerial photography of at least part of the survey site can be analyzed using photogrammetric techniques. In some cases, an unmanned aerial system can be used to collect site imagery. The use of a UAS can reduce the fiscal and chronological cost of a survey, compared to the use of other types aerial imagery and/or conventional terrestrial surveying techniques used alone.

23 Claims, 5 Drawing Sheets

(56) References Cited

U.S. PATENT DOCUMENTS

| | | | |
|---|---|---|---|
| 7,526,384 B2 | 4/2009 | MacIntosh et al. | |
| 7,541,974 B2 | 6/2009 | Scherzinger | |
| 7,543,780 B1* | 6/2009 | Marshall et al. | 244/194 |
| 7,611,105 B1 | 11/2009 | Carazo | |
| 7,619,561 B2 | 11/2009 | Scherzinger | |
| 7,646,339 B2 | 1/2010 | Green et al. | |
| 7,697,127 B2 | 4/2010 | Glimm et al. | |
| 7,719,467 B2 | 5/2010 | Norda et al. | |
| 7,940,211 B2 | 5/2011 | Scherzinger | |
| 7,978,128 B2 | 7/2011 | Scherzinger | |
| 7,991,575 B2 | 8/2011 | Vogel et al. | |
| 8,024,144 B2 | 9/2011 | Kludas et al. | |
| 8,125,379 B2 | 2/2012 | Allison | |
| 8,229,166 B2 | 7/2012 | Best et al. | |
| 8,285,512 B2 | 10/2012 | Vogel et al. | |
| 8,348,166 B2 | 1/2013 | Hanson | |
| 8,416,130 B2 | 4/2013 | Scherzinger | |
| 8,427,632 B1 | 4/2013 | Nash et al. | |
| 8,625,086 B2 | 1/2014 | Vogel et al. | |
| 8,629,905 B2 | 1/2014 | Svanholm | |
| 8,633,588 B2 | 1/2014 | Lin et al. | |
| 8,754,805 B2 | 6/2014 | Wang et al. | |
| 8,897,482 B2 | 11/2014 | Mein et al. | |
| 2002/0012071 A1* | 1/2002 | Sun | 348/578 |
| 2003/0137449 A1 | 7/2003 | Vashisth et al. | |
| 2003/0218540 A1* | 11/2003 | Cooper et al. | 340/539.26 |
| 2004/0105090 A1 | 6/2004 | Schultz et al. | |
| 2004/0228517 A1 | 11/2004 | Massen | |
| 2005/0025313 A1 | 2/2005 | Wachtel et al. | |
| 2005/0031197 A1 | 2/2005 | Knopp | |
| 2005/0057745 A1 | 3/2005 | Bontje | |
| 2005/0069195 A1 | 3/2005 | Uezono et al. | |
| 2005/0125142 A1 | 6/2005 | Yamane | |
| 2006/0017938 A1 | 1/2006 | Ohtomo et al. | |
| 2006/0195254 A1 | 8/2006 | Ladetto et al. | |
| 2007/0133012 A1 | 6/2007 | Euler | |
| 2007/0188601 A1 | 8/2007 | Rohaly et al. | |
| 2007/0247457 A1* | 10/2007 | Gustafsson et al. | 345/420 |
| 2007/0297696 A1* | 12/2007 | Hamza et al. | 382/294 |
| 2009/0074254 A1* | 3/2009 | Jamison et al. | 382/113 |
| 2009/0154793 A1 | 6/2009 | Shin et al. | |
| 2009/0220144 A1 | 9/2009 | Mein et al. | |
| 2009/0225161 A1 | 9/2009 | Otani et al. | |
| 2009/0231574 A1 | 9/2009 | Vogel et al. | |
| 2009/0262974 A1 | 10/2009 | Lithopolous | |
| 2010/0157283 A1 | 6/2010 | Kirk et al. | |
| 2010/0168949 A1* | 7/2010 | Malecki et al. | 701/24 |
| 2010/0172546 A1 | 7/2010 | Sharp | |
| 2010/0174507 A1 | 7/2010 | Vogel et al. | |
| 2010/0305857 A1* | 12/2010 | Byrne et al. | 701/301 |
| 2010/0309311 A1 | 12/2010 | Svanholm | |
| 2010/0322482 A1 | 12/2010 | Kochi | |
| 2011/0007154 A1 | 1/2011 | Vogel et al. | |
| 2011/0064312 A1 | 3/2011 | Janky et al. | |
| 2011/0158475 A1 | 6/2011 | Otani et al. | |
| 2011/0282578 A1 | 11/2011 | Miksa et al. | |
| 2011/0285587 A1 | 11/2011 | Vollath et al. | |
| 2011/0290937 A1* | 12/2011 | Salkeld | 244/80 |
| 2012/0026322 A1 | 2/2012 | Malka et al. | |
| 2012/0029732 A1* | 2/2012 | Meyer | 701/2 |
| 2012/0093394 A1 | 4/2012 | Li | |
| 2012/0114229 A1 | 5/2012 | Zhou | |
| 2012/0155747 A1 | 6/2012 | Hwang | |
| 2012/0163656 A1 | 6/2012 | Wang et al. | |
| 2012/0166137 A1 | 6/2012 | Grässer et al. | |
| 2012/0274775 A1* | 11/2012 | Reiffel | 348/158 |
| 2012/0326923 A1* | 12/2012 | Oehler et al. | 342/357.29 |
| 2012/0330601 A1 | 12/2012 | Soubra et al. | |
| 2013/0161810 A1 | 6/2013 | Gräesser et al. | |
| 2013/0228645 A1* | 9/2013 | Van Speybroeck et al. | 244/13 |
| 2013/0253822 A1* | 9/2013 | Fortune et al. | 701/518 |
| 2013/0298083 A1* | 11/2013 | Bertoldo et al. | 715/835 |
| 2014/0019179 A1* | 1/2014 | Gosalvez et al. | 705/7.11 |
| 2014/0081571 A1 | 3/2014 | Briggs et al. | |
| 2014/0091481 A1 | 4/2014 | Lin et al. | |
| 2014/0156219 A1 | 6/2014 | Soubra et al. | |
| 2014/0195150 A1* | 7/2014 | Rios | 701/469 |
| 2014/0222246 A1* | 8/2014 | Mohamadi | 701/2 |
| 2014/0375773 A1 | 12/2014 | He et al. | |
| 2015/0036888 A1 | 2/2015 | Weisenburger | |
| 2015/0268043 A1 | 9/2015 | McFadden et al. | |
| 2015/0276402 A1 | 10/2015 | Grasser et al. | |

FOREIGN PATENT DOCUMENTS

| | | |
|---|---|---|
| EP | 1944572 A1 | 7/2008 |
| EP | 1936323 B1 | 3/2010 |
| EP | 1931945 B1 | 4/2011 |
| WO | WO 91/19265 | 12/1991 |
| WO | WO 2009/100728 A1 | 8/2009 |
| WO | WO 2009/100773 A1 | 8/2009 |
| WO | WO 2009/100774 A1 | 8/2009 |
| WO | WO 2009/103342 A1 | 8/2009 |
| WO | WO 2009/106141 A1 | 9/2009 |
| WO | WO 2010/080950 A1 | 7/2010 |
| WO | WO 2011/005783 A2 | 1/2011 |
| WO | WO 2011/088509 | 7/2011 |
| WO | WO 2011/131382 A1 | 10/2011 |
| WO | WO 2012/088413 A1 | 6/2012 |
| WO | WO 2014/055428 A2 | 4/2014 |
| WO | WO 2014/055430 A2 | 4/2014 |
| WO | WO 2014/081535 A1 | 5/2014 |
| WO | WO 2014/205277 A1 | 12/2014 |

OTHER PUBLICATIONS

Elphel, Inc. (2011) Elphel-Eyesis 4π http://www3.elphel.com/eyesis-4pi, accessed on: Feb. 29, 2012, 4 pages.

Elphel, Inc. (Nov. 12, 2011) Elphel-Eyesis 4π Brochure, www.elphel.com accessed on Feb. 29, 2012, 12 pages.

Elphel, Inc. (Mar. 10, 2010) Elphel Development Blog first Elphel Eyesis Prototype assembled, www.elphel.com accessed on Mar. 1, 2012, 7 pages.

Elphel, Inc. (2011) Imaging solutions with Free software and open hardware, www3.elphel.com accessed on Mar. 1, 2012, 2 pages.

International Preliminary Report on Patentability (IPRP) by the International Bureau for PCT International Patent Application No. PCT/US11/66839, mailed Jul. 4, 2013, 6 pages.

International Search Report and Written Opinion prepared by the U.S. Patent and Trademark Office as International Searching Authority for PCT International Patent Application No. PCT/US11/66839, mailed Mar. 12, 2012; 12 pages.

International Search Report and Written Opinion prepared by the U.S. Patent and Trademark Office as International Searching Authority for PCT International Patent Application No. PCT/US13/62674, mailed Mar. 10, 2014; 18 pages.

International Search Report and Written Opinion prepared by the U.S. Patent and Trademark Office as International Searching Authority for PCT International Patent Application No. PCT/US13/62679, mailed Mar. 28, 2014; 16 pages.

Nasvik, "Site Layout with Robotic Total Stations", Dec. 2003 [retrieved on Jan. 25, 2014]. Retrieved from the Internet:<URL:http://www.concreteconstruction.net/Images/Site%20Layout%20with%20Robotic%20Total%20Stations_tcm45-590322.pdf> p. 3, paragraph [0000].

U.S. Appl. No. 13/167,733, filed Jun. 24, 2011 by Wang et al. and entitled "Method and Apparatus for Image-Based Positioning," 77 pages.

U.S. Appl. No. 13/332,648, filed Dec. 21, 2011; 104 pages.

U.S. Appl. No. 13/332,648; Notice of Publication dated Jun. 28, 2012; 1 page.

U.S. Appl. No. 13/922,772, filed Jun. 20, 2013; 49 pages.

International Preliminary Report on Patentability (IPRP) prepared by the International Bureau for PCT International Patent Application No. PCT/US13/67115, mailed Jun. 4, 2015; 9 pages.

(56) References Cited

OTHER PUBLICATIONS

International Preliminary Report on Patentability (IPRP) prepared by the International Bureau for PCT International Patent Application No. PCT/US13/62674, mailed Jun. 18, 2015; 10 pages.

International Preliminary Report on Patentability (IPRP) prepared by the International Bureau for PCT International Patent Application No. PCT/US13/62679; mailed Apr. 16, 2015; 8 pages.

U.S. Appl. No. 13/332,648; Non Final Office Action dated Dec. 5, 2014; 83 pages.

U.S. Appl. No. 13/332,648; Notice of Allowance dated Jul. 7, 2015; 44 pages.

U.S. Appl. No. 13/922,772; Non Final Office Action dated May 28, 2015; 37 pages.

Tahar et al. "UAV-Based Stereo Vision for Photogrammetric Survey in Aerial Terrain Mapping," 2011 International Computer Applications and Industrial Electronics (ICCAIE 2011), pp. 443-447.

International Search Report and Written Opinion prepared by the European Patent Office as International Searching Authority for PCT International Patent Application No. PCT/US13/67115, mailed Jan. 27, 2014, 14 pages.

U.S. Appl. No. 13/922,772; Notice of Allowance dated Sep. 21, 2015; 20 pages.

* cited by examiner

INTEGRATED AERIAL PHOTOGRAMMETRY SURVEYS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to aerial photography and more particularly, to novel solutions employing photogrammetric analysis of aerial photography.

BACKGROUND

Land surveys are an important part of the planning and construction processes. Conventionally, preparing a land survey required extensive use of terrestrial survey instruments to obtain position measurements of various features within the survey site. The expense of the equipment involved, along with the required time commitment and labor-intensive nature of the measurements, necessarily requires considerable investment in time and money prior to beginning any development activities.

On the other hand, aerial photography of a subject area can provide a relatively efficient way to quickly gain a rough understanding of the topology of an area. Such photography, however, generally is performed using aircraft and/or satellites, which necessarily entail significant costs and administrative inconvenience. Moreover, aerial photographs, which necessarily are taken from altitudes ranging from several thousand feet to several miles, cannot provide imagery with sufficient resolution to allow analysis with the precision required for a land survey.

Accordingly, there is a need for more efficient techniques to generate data necessary for land surveys.

BRIEF SUMMARY

A set of embodiments provides novel solutions for generating survey data about a survey site. In an aspect, some embodiments employ aerial photography of at least part of the survey site, and in another aspect, some embodiments analyze the aerial photography using photogrammetric techniques. Certain embodiments employ an unmanned aerial system ("UAS") to collect site imagery. The use of a UAS can reduce the cost of a survey, compared to the use of other aerial imagery (e.g., conventional aerophotography and/or satellite imagery), which can require interaction with regulatory authorities, leasing of expensive equipment, and/or significant advanced planning.

Further, some embodiments can provide accuracy and/or precision comparable to a conventional terrestrial survey at a lower cost, due to a need for fewer (or no) measurements taken using terrestrial survey equipment. Instead, such embodiments can employ aerial photography to capture site data relatively quickly. Unlike conventional aerial photographs, however, the images captured by certain embodiments can have sufficient resolution to allow photogrammetric analysis to generate relatively precise and/or accurate position data about features of interest on the survey site. For example, in some embodiments, the UAS can capture site imagery from a height of less than 800 feet, which would be infeasible for conventional aerophotography.

In some cases, the data set generated from one or more aerial photographs can be integrated with a data set generated from another data source, such as a terrestrial survey instrument. Using this technique, aerial data can be supplemented with terrestrial survey data to orient the aerial data and/or to provide survey data in areas for which aerial data is unavailable or infeasible to collect, such as areas obscured from overhead visibility (e.g., areas under bridges or other structures, areas with heavy tree coverage, etc.).

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments might comprise operating an unmanned aerial system and/or collecting, with the unmanned aerial system, imagery of a subject area. In some cases, the method can comprise producing, e.g., at a computer, feature data. In some cases, this feature data might be produced by analyzing the imagery photogrammetrically. In further embodiments, the method can include generating, (e.g., at the computer), a land survey based at least in part on the feature data.

A method in accordance with another set of embodiments might comprise operating an unmanned aerial system. The method might further include collecting, with the unmanned aerial system, aerial imagery of a subject area. In some cases, the unmanned aerial system might transmit the imagery (e.g., via a wired or wireless link, in flight or post-flight), and the method might further comprise receiving, at a computer, the aerial imagery collected by the unmanned aerial system. In a typical embodiment, the method can include producing, at the computer, a first feature data set by analyzing the aerial imagery photogrammetrically.

The method can also include combining the first feature data set with a second feature data set to produce a combined feature data set. This operation can also be performed by a computer programmed with software provided by various embodiments. The second feature data set might include any of a variety of different types of data, which can be collected from a variety of different data sources. Merely by way of example, in one embodiment, the second feature data set might comprise data collected by one or more terrestrial survey instruments. On such instrument might be a panoramic imagery system, which can be used to collect panoramic imagery (e.g., of at least a portion of the subject area), and the second feature data set might be generated by analyzing the panoramic imagery photogrammetrically. In another aspect, the second feature data set might comprise feature data about a portion of the subject area that is obscured from the unmanned aerial system and/or un-captured in the aerial imagery.

Different techniques can be used to combine multiple, different data sets. Merely by way of example, in one embodiment, an aerial feature data set can be combined and/or integrated with a terrestrial survey feature data set by identifying one or more tie points in the terrestrial survey feature data set; in an aspect, each of the one or more tie points might have a known location on a reference coordinate system. Next, a location can be identified, in the aerial imagery, of each of the one or more tie points. Each such location of one of the tie points in the aerial imagery can be correlated with a corresponding known location on the reference coordinate system. Based on the coordinated location of each of the one or more tie points, the aerial imagery can be oriented.

In another aspect, producing the first feature data set might comprise generating a first point cloud from the aerial imagery, and/or producing the second feature data set might comprise generating a second point cloud, e.g., from data collected by one or more terrestrial survey instruments. In this case, the combined data set comprises an integrated point cloud generated from the first point cloud and the second point cloud.

The feature data set from the aerial imagery and/or a combined data set can be used for a variety of purposes. Merely by way of example, in one embodiment, the method can include generating, at the computer, a land survey of at least a portion of the subject areas, based at least in part on the combined feature data set. In another embodiment, the method can comprise generating a terrain map from the land survey.

In other cases, the method might comprise presenting the imagery to a user. For example, in some cases, the method might comprise generating an aerial ortho-image mosaic from the aerial imagery and correlating one or more panoramic images with the aerial ortho-image mosaic. These correlated images can be presented in different ways. For instance, in some cases, the method might comprise presenting, in a user interface, the aerial imagery using a plan view, receiving user input to zoom into an area of focus on the plan view, and/or presenting, in the user interface, one or more panoramic images as three dimensional panorama bubbles corresponding to the area of focus. Alternatively and/or additionally, the method might comprise presenting, in a user interface, the aerial imagery and the panoramic imagery integrated in a three-dimensional perspective.

An apparatus in accordance with yet another set of embodiments might comprise a computer readable medium having encoded thereon a set of instructions executable by one or more computers to perform one or more operations, including without limitation one or more operations in accordance with methods provided by other embodiments. Merely by way of example, one set of instructions might comprise instructions to receive aerial imagery collected by an unmanned aerial system and/or instructions to produce a first feature data set by analyzing the aerial imagery photogrammetrically. The set of instructions might further comprise instructions to combine the first feature data set with a second feature data set to produce a combined feature data set; the second feature data set might comprise data collected by one or more terrestrial survey instruments. The set of instructions might further comprise instructions to generate a land survey of at least a portion of the subject areas, based at least in part on the combined feature data set.

A system in accordance with another set of embodiments might comprise a computer comprising a processor and non-transitory computer readable medium having encoded thereon a set of instructions executable by the processor to perform one or more operations. As noted above, the set of instructions might be executable to perform one or more operations in accordance with the methods provided by other embodiments. In some cases, the system might further comprise an unmanned aerial system comprising an imaging system configured to capture aerial imagery of a subject area. The imaging system, in one aspect, might feature a plurality of imaging devices configured to capture digital stereo imagery of the subject area.

In another embodiment, the system might comprise a terrestrial survey instrument configured to collect the data to produce a second feature data set. Such terrestrial survey instruments can include, but are not limited to, a total station, a camera (e.g., a panoramic camera) and/or a set of cameras, a laser scanner, an electronic distance measurement system (which might comprise a laser), a global navigation satellite system receiver, and/or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Some embodiments include systems, methods, and/or software that can capture, and/or photogrammetrically analyze, aerial imagery captured by a UAS. In some cases, these tools can generate, from such imagery, survey data about a survey site. The use of a UAS can provide several advantages: it can provide survey-quality data at a fraction of the time and expense required for a survey produced from terrestrial survey instruments alone. For instance, a typical survey area for a UAS survey might be approximately 2 $km^2$, which would require substantial time and expense to survey with terrestrial instruments alone. For any site above approximately 10 acres (and even sites smaller than that), however, the use of a UAS can provide substantial enhancement in performance, and corresponding reductions in cost, when compared with conventional terrestrial surveying techniques Further, a UAS can provide much higher quality imagery than conventional aerophotography or satellite imagery, due to the vastly reduced altitude of the UAS (as compared to an airplane or satellite). For example, a UAS can capture imagery at a height of between 100 and 800 feet above ground level ("AGL"), or more particularly, in some cases, a height of between 300 and 600 feet AGL, altitudes that are infeasible or impossible for a conventional airplane or satellite to maintain with any degree of safety. As a result, while a conventional ground sampling distance (pixel size) for a conventional fixed wing platform is approximately 0.5 m, a UAS provided by typical embodiments might provide a ground sampling distance of approximate 2.0 cm.

Thus, unlike conventional aerial photographs, UAS imagery can provide sufficient resolution to allow photogrammetric analysis to generate relatively precise and/or accurate position data about features of interest on the survey site. Hence, such embodiments can provide accuracy and/or precision comparable to a conventional terrestrial survey at a lower cost, due to a need for fewer (or no) measurements taken using terrestrial survey equipment.

Further, the use of a UAS can avoid much of the cost and restrictions imposed by more conventional aerophotography. In general, a low-level flight by a UAS over a discrete survey site does not require filing of a formal flight plan, scheduling of aerial assets, or any of the myriad inconveniences associated with conventional aerophotography. Instead, a survey team can launch the UAS ad hoc, at the survey site, and quickly gather sufficient imagery to allow a survey to be produced.

In some cases, the data set generated from one or more aerial photographs can be integrated with a data set generated from one or more other data sources, such as a terrestrial survey instruments. Using this technique, aerial data can be supplemented with terrestrial survey data to orient the aerial data and/or to provide survey data in areas for which aerial data is unavailable or infeasible to collect, such as areas obscured from overhead visibility (e.g., areas under bridges or other structures, areas with heavy tree coverage, etc.).

Further, the integration of terrestrial survey techniques with aerial survey techniques can provide numerous advantages over the use of either technique exclusively. Merely by way of example, by integrating historical terrestrial survey data, an operator can expedite the planning of aerial flight plans by informing the capture area of the aerial survey, for example, by providing known feature data, boundaries of the survey site, ground control target positioning, and/or the like.

In accordance with some embodiments, ground control points can be processed by the software as native data (e.g., in the same environment as the aerial and/or terrestrial image processing), eliminating the need for inconvenient and error-prone data import operations. Similarly, airborne GNSS data (e.g., data captured by an GNSS real time kinematics ("RTK") receiver on the UAS) can be processed in the same environment, again, without the need for import operations and/or can be enhanced by data received from terrestrial GNSS receivers. In this environment, terrestrial and aerial images (and/or other terrestrial survey data) can be combined to measure individual features in the captured images), and in some cases, terrestrial and aerial images can be combined photo-realistic "virtual tours" of a project site.

Much of this functionality is enabled by the ability of the office software provided by certain embodiments (and the methods performed by that software and/or compute systems programmed with the software) to treat a UAS as a "flying total station." In other words, the software has the novel ability to treat airborne imagery and data in the same fashion as imagery and data captured terrestrially. Using this functionality, imagery and data captured from a UAS or other airborne platform can be integrated into any surveying workflow supported by the office software with respect to terrestrial measurements.

Figure 1:
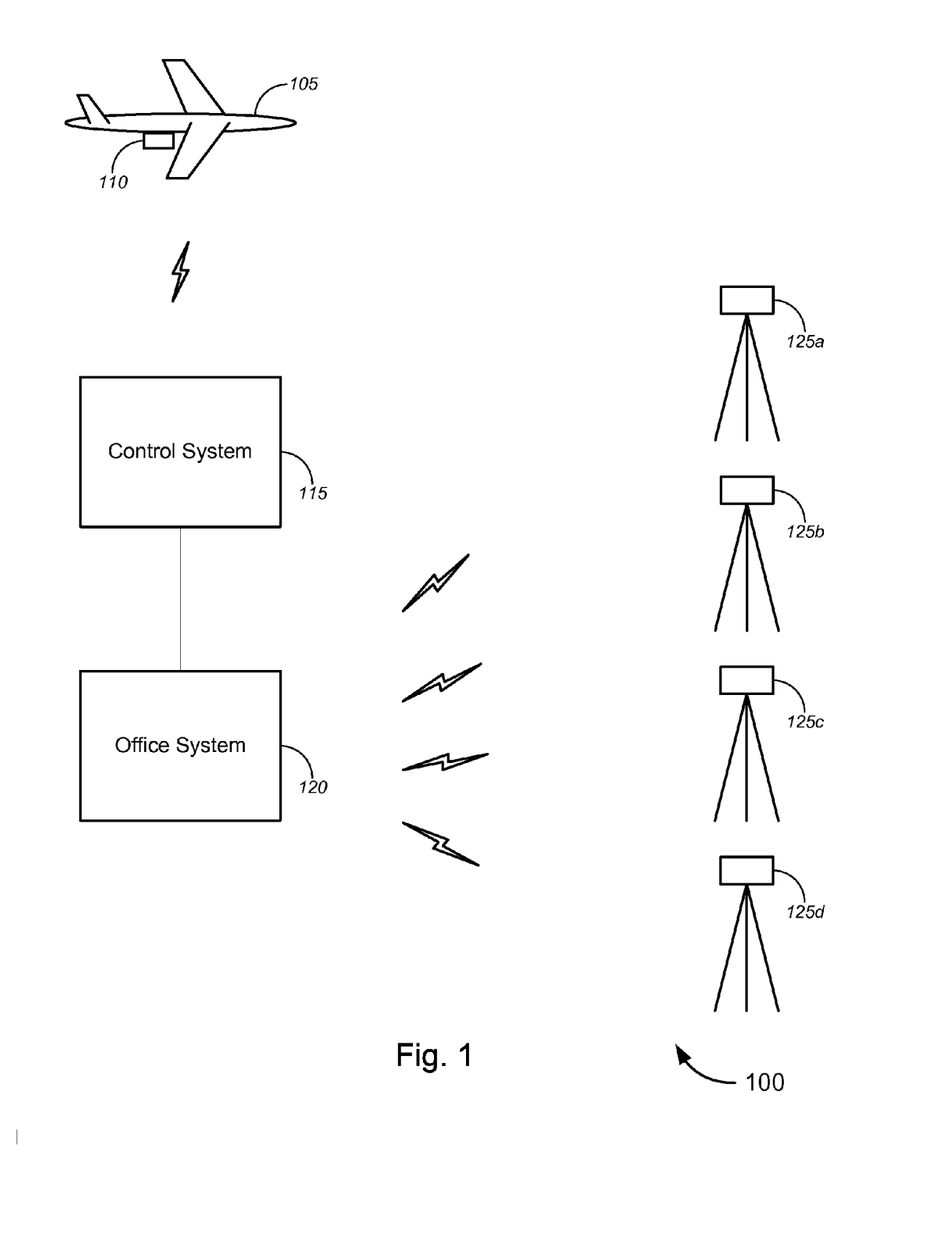
FIG. 1 is a block diagram illustrating a system for performing aerial photogrammetry in accordance with various embodiments.

Turning to the figures, FIG. 1 illustrates a system 100 that can be used to capture aerial imagery and/or to produce survey data therefrom, in accordance with one set of embodiments. The system 100 comprises a UAS 105. Some example of UAS that can be used with various embodiments are described in International Publication No. WO 2011/131382, filed by Gatewing NV and published Oct. 27, 2011, which is incorporated herein by reference. An exemplary embodiment can employ a UAS such as the X100™, commercially available from Gatewing NV, although different embodiments can employ any aerial platform that provides sufficient image resolution to support the photogrammetry techniques described herein.

In an aspect of some embodiments, the UAS 100 comprises an imaging system 110, which can be configured to capture aerial imagery of a subject area (e.g., a survey site and/or a portion thereof). A variety of different imaging systems can be used in accordance with different embodiments. Merely by way of example, the Gatewing X100™ features an imaging system that provides sufficient performance. In some embodiments, the imaging system comprises a digital stereo imaging system (which might comprise a plurality of cameras or other image capture devices) that is configured to capture digital stereo imagery of a subject area. An aerial system with multiple image sensors can be capable of mapping more terrain and generating more overlap between passes with fewer flight lines. This can reduce the time to capture imagery and/or expand the coverage capability of the UAS.

As illustrated, the system 100 includes a control system 115, which communicates with the UAS 105 to provide flight control information to the UAS 105 and/or to receive data from the UAS 105. Such communications generally will be wireless radio-frequency ("RF") communications, although wired communications are possible as well. In an exemplary embodiment, the control system 115 can use ultra high frequency ("UHF") communications to communicate with the UAS 105; in other embodiments, a variety of technologies, including cellular, wireless wide area network ("WWAN") and the like can provide communications between the control system 115 and the UAS 105. In an aspect, then, the control system 115 can include (and/or can be in communication with) appropriate communication hardware to communicate with the UAS 105, such as a wireless radio, etc. Correspondingly, the UAS 105 can include similar communication hardware for communicating with the control system 115.

The UAS 105 generally will also include a processing system (not illustrated by FIG. 1), which can receive commands from the control system 115 and/or can control operation of the UAS 105 (such as movement of control surfaces, thrust and/or prop speed, etc.) and/or the imaging system 110. In some cases, the UAS 105 might transmit real-time imagery captured by the imaging system 110 to the control system 115, for display to an operator, who can control operation of the US based on the received imagery. In some cases, this imagery might be stored by the control system 115 for further photogrammetric analysis (e.g., as described in further detail below).

Alternatively and/or additionally, the UAS 105 might include a storage medium (not illustrated on FIG. 1), such as flash memory (which can be permanently installed and/or removable, such as a USB drive), a disk drive, etc., which can be used to store operational commands, captured imagery, etc. In some cases, the UAS 105 might capture imagery at a relatively high resolution and transmit imagery to the control system 115 at a relatively low resolution (e.g., due to bandwidth limitations). In such cases, the UAS 105 might store the high-resolution imagery on the storage medium for download by the control system 115 (and/or another device) post-flight, when higher download bandwidth (and/or more download time) is available.

In some embodiments, the system 100 might include an office computer system 120, which is programmed with an office software package that can be used to receive aerial and/or terrestrial images and/or data, perform the survey workflows, photogrammetric analysis, data set integration, and/or survey generation functions described in further detail below. In some cases, the office computer system 120 might incorporate the functions of the control system 115 and a single computer system. In other cases, the office computer system 120 may be in communication with the control system 115 (e.g., using any of a variety of well-known networking techniques). Hence, the office system 120 might be proximate the control system 115 (e.g., at the survey site) and/or might be remote from the control system 115 (e.g., at an office location of the operator or another user). In other cases, the office computer system might be independent of the UAS 105 and/or the control system 115 and might merely receive data from those components (and/or others) using any appropriate data transfer technique.

As illustrated by FIG. 1, the system 100 might include one or more terrestrial survey instruments 125, which can collect feature data, e.g., in conventional fashion. This feature data can be combined with feature data obtained from the aerial imagery, for example as described in further detail below. In particular cases, a terrestrial survey instrument 125 might capture panoramic imagery, which can be integrated with aerial imagery captured by the UAS 105, in accordance with embodiments discussed below. Terrestrial survey instruments 125 can include a variety of different instruments, including without limitation those known to skilled artisans in the surveying field. Such instruments can include, without limitation, total stations 125a (such as those available from Trimble Navigation Ltd.), global navigation satellite system ("GNSS") receivers 125b, laser scanners 125c (including three-dimensional laser scanners, electronic distance measurement ("EDM") systems that employ lasers to measure distances, etc.), panoramic cameras 125d and/or any other instruments that can be used to collect feature data about the subject area. Such feature data can include, but is not limited to, position data about tie points, reference points, and/or features of interest in the subject area, azimuth data, and/or the like.

Operation of the system 100 in accordance with various embodiments is described in further detail below with regard to the methods of FIGS. 2 and 3, but as a general matter, the system operates to collect aerial imagery with the UAS 105 and/or terrestrial survey data and/or panoramic images with one or more terrestrial survey instruments 125 and to produce correlated imagery, land surveys and/or other feature data from one or more of these data sets. It should be noted that, while the system 100 might collect the aerial imagery/data and/or terrestrial survey instrument imagery/or data directly, in other aspects, components of the system (such as the office computer system 120) can function using data collected with other means (such as third-party data, etc.), so long as that data has sufficient accuracy and/or precision to provide usable output.

Figure 2:
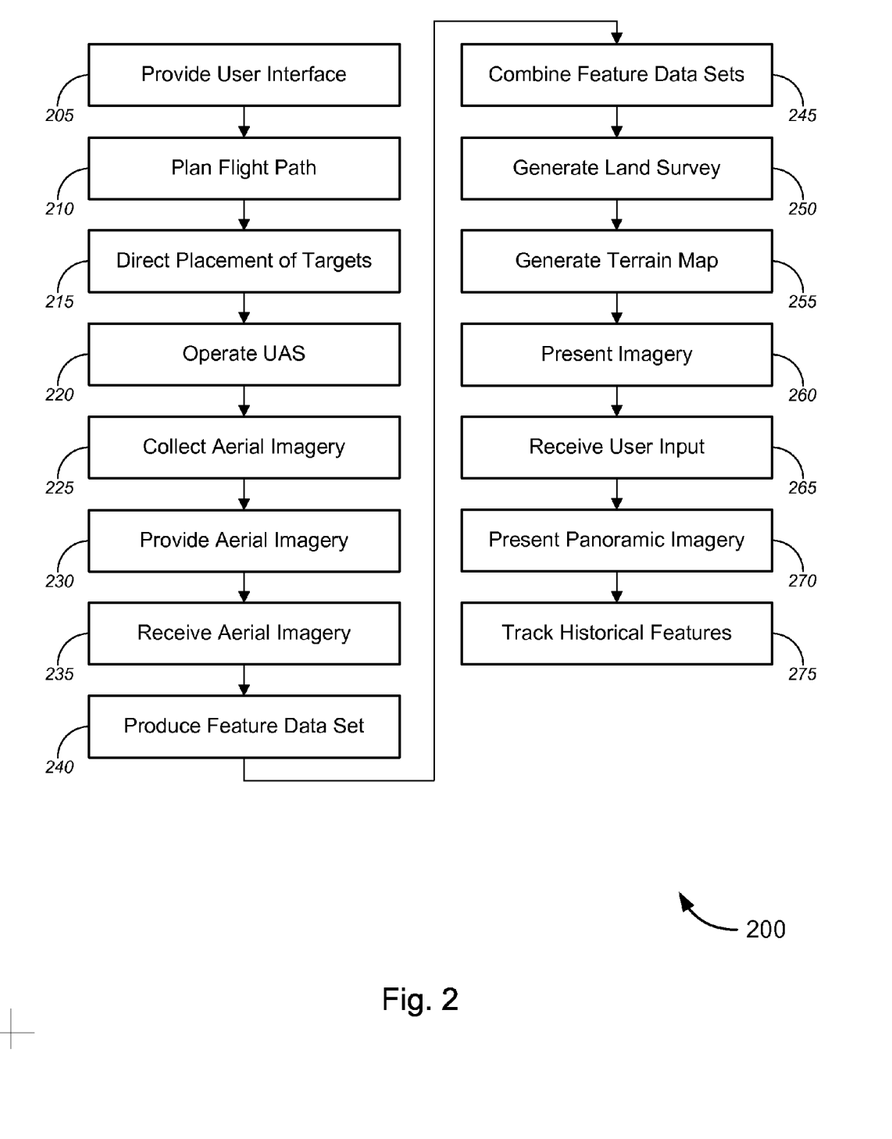
FIGS. 2, 2A, and 2B are a process flow diagrams illustrating methods of aerial photogrammetry in accordance with various embodiments.
Figure 3:
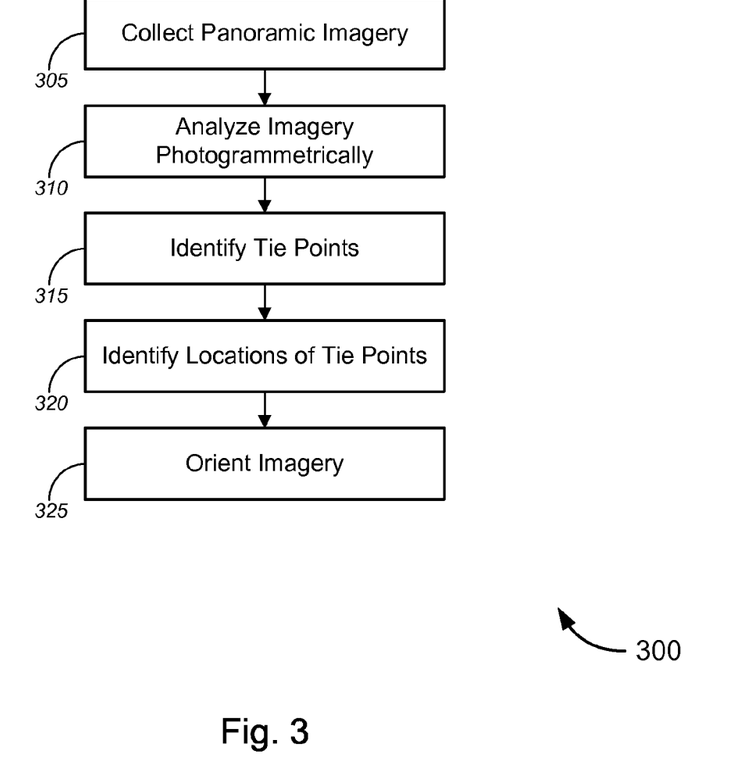
FIGS. 3 and 3A are a process flow diagrams illustrating methods of integrating feature data sets, in accordance with various embodiments.

FIGS. 2 and 3 illustrate various methods that can be used to produce a land survey and/or other usable information from aerial imagery. While the methods of FIGS. 2 and 3 are illustrated, for ease of description, as different methods, it should be appreciated that the various techniques and procedures of these methods can be combined in any suitable fashion, and that, in some embodiments, the methods depicted by FIGS. 2 and 3 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2 and 3 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2 and 3 (e.g., by executing instructions embodied on a computer readable medium), the system 100 can also operate according to other modes of operation and/or perform other suitable procedures.

FIG. 2, for example, illustrates a method 200 of performing aerial photogrammetry in accordance with various embodiments. In the illustrated embodiment, the method 200 comprises providing a user interface (block 205). The user interface can provide interaction between a user (e.g., an operation of a UAS, a data analyst in a surveyor's office, etc.) and a computer system (e.g., a UAS control system, an office computer system, an integrated office/control system, or any other type of computer system). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens, each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or for receiving input from a user, the user interface may be the vehicle for the exchange of such input/output. Merely by way of example, in a set of embodiments, the user interface can allow a user to provide input regarding control of a UAS and/or aerial imaging system, review feature data collected by the system, view imagery, and/or the like.

For instance, some embodiments might allow for manual control of a UAS; such control might be provided through the user interface of a control system (and/or through a dedicated remote control device). In other cases, however, the operator might want the UAS to overfly a particular survey site systematically to ensure proper imaging coverage of that site. In such cases, at block 210, the method 200 might comprise planning a flight path for the UAS. For example, a computer system, such as a control system, might receive user input via a user interface. This user input might define an area (e.g., by address locations, GNSS coordinates, etc.) of which aerial imagery is desired.

The computer system, then, can plan a flight path for the UAS. Different embodiments might weigh different factors more or less heavily in planning the flight path. Merely by way of example, in some cases, the system might attempt to ensure the most efficient flight path (e.g., the flight path with the least travel time that still ensures photographic coverage of the entire subject area). In other cases, the system might plan the flight path to ensure comprehensive coverage, even at the expense of efficiency, for example by ensuring that each point in the subject area is captured in at least three (or more) images, etc. Taking into account these considerations, a computer system (e.g., an office computer system, a control system, etc.) can define a flight path for the UAS that ensures that the UAS will capture the desired imagery of the subject area. In some cases, the flight path might be defined as a pattern, such as a grid, which will ensure adequate photographic coverage to allow photogrammetric analysis. The computer can take into account factors such as the orientation, resolution, focal length, and/or field of view, of the imaging system to determine altitude, number of passes over the subject area, horizontal distance between passes, and/or the like.

The defined flight path can include both location of the UAS at various points along the path, as well as locations and/or times at which imagery should be captured. In some cases, the UAS might capture video imagery, e.g., at 30 frames per second or any other appropriate frame rate, in which case image capture parameters might not need to be included in the flight path. In other cases, the UAS might capture still images, either at specified intervals, and/or on command, in which case such intervals can be defined as part of the flight path.

In an aspect of particular embodiments, existing terrestrial survey data can be used to plan the flight path, in several ways. Merely by way of example, terrestrial survey data can be used to determine the mapping extents of the survey area, for example by reference to a known coordinate system. Terrestrial survey data (such as GNSS coordinates, to name one example) can be used to determine the boundaries of the survey area, which then can inform outside boundaries of the flight path of the UAS. Additionally and/or alternatively, terrestrial survey data can be used to plan the flight path itself, for example to generate a flight path that will ensure that the captured aerial imagery will include all portions of the survey site for which no terrestrial survey data exists, and/or to generate a flight path that does not include aerial coverage of any areas adequately captured by terrestrial surveying (with imagery and/or other measurements) or of obscured areas. Terrestrial survey data can also be used at the planning stage to ensure that the flight path of the UAS will not intersect with power lines, buildings, or other obstacles, and/or to generate a flight path that captures sufficient known reference points (and/or tie points captured by terrestrial imagery) to enable orientation of the aerial images (by reference to a known coordinate system and/or with respect to other aerial and/or terrestrial imagery). From these examples, one skilled in the art can ascertain that existing terrestrial survey data can be used for a variety of functions in planning a UAS flight path.

In different embodiments, a UAS can be controlled in a variety of ways (subject, of course, to constraints imposed by the hardware and/or software of the UAS). Merely by way of example, as noted above, in some cases, the UAS might be controlled manually through inputs at a control system and/or the like. In other cases, the UAS might be equipped with onboard navigation equipment, such as a GNSS receiver, which can provide the UAS with the ability to follow a preprogrammed flight path.

In yet other embodiments, the UAS might navigate pursuant to the placement of one or more ground targets, which the UAS might sense optically, through the reception of RF signals emitted by the ground targets, and/or the like. In such cases, the method 200 may comprise directing placement of ground control targets corresponding to the flight path (block 215). For instance, as noted above, terrestrial survey data can be used to plan the flight path, and the ground control targets can be used, in some cases, to define that flight path. Hence, terrestrial survey data can be of use when determining where to place ground control targets to define the planned flight path. Merely by way of example, an office computer system, control system, and/or the like might identify locations on the ground (e.g., by GNSS coordinates, by reference to local features, and/or the like) at which ground control targets should be placed in order to correctly guide the UAS on the specified flight path. Such identification might be graphical (e.g., by superimposing images of the ground control targets on an overhead photograph of the site) and/or graphical (e.g., by displaying, printing, etc.) address information, GNSS coordinates, and/or the like that identify, to whatever precision necessary, the location(s) at which ground control targets should be placed.

The method 200 might further comprise operating the UAS (block 220). Depending on the nature of the UAS control scheme (as described above), operating the UAS might merely comprise communicating a flight path from a ground-based control system to the UAS (either pre-flight or in-flight) and launching the craft. In other cases, the UAS might respond to the ground control targets automatically, such that operating the UAS merely requires launching the craft. In yet other cases, operating the UAS might comprise manually providing control inputs, e.g., via a ground-based control system.

Figure 2A:
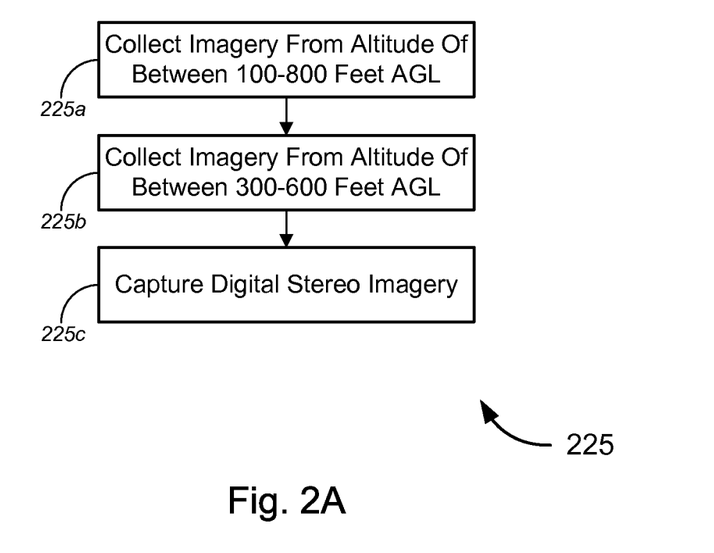

At block 225, the method comprises collecting aerial imagery of a subject area, such as a survey site. In some cases, such imagery is collected with the imaging system of a UAS, as described above, for example. Depending on the embodiment, the imagery might be captured automatically and/or on command (e.g., from a ground-based control station). The imagery might be still photographs, digital stereo photographs, video, and/or the like. For example, in some cases, by reference to FIG. 2A, collecting aerial imagery might comprise collecting aerial imagery from an altitude of between 100 and 800 feet AGL (block 225a) and/or more particularly, in some cases, from an altitude of between 300 and 600 feet AGL (block 225b). Alternatively and/or additionally, collecting aerial imagery might comprise capturing digital stereo imagery with the UAS (block 225c).

At block 230, the UAS provides the aerial imagery to another device for display, analysis, and/or the like. This operation can be accomplished in a variety of different ways. Merely by way of example, as described above, the UAS might include a wireless and/or wired communication system, and providing the aerial imagery might comprise transmitting the aerial imagery, using the communication system (e.g., over a network) and/or via a direct connection, such as a USB connection, to the other device, which might be a control system, office computer system, and/or the like. Such transmission might be performed in-flight, post-flight, and/or in any other appropriate manner. Alternatively and/or additionally, the UAS might include a storage medium for storing the aerial imagery, and/or the storage medium might be removable. For example, in some cases, the UAS might store the imagery on a removable memory device (such as a flash drive, and/or the like), and providing the imagery to another device may comprise removing the removable memory and inserting the removable memory device into the device that is to receive the aerial imagery. Other techniques for providing the imagery to other devices can be employed as well.

In some cases, the method 200 comprises receiving the aerial imagery at a computer system, such as an office computer system (block 235). Merely by way of example, as noted above, in accordance with particular embodiments, a UAS might capture and transmit aerial imagery over a wired connection, a wireless connection, and/or through transfer of storage media. Receiving the imagery at a computer system, therefore, can comprise receiving the transmission and/or obtaining the imagery from inserted storage media. In other cases, the computer system may receive imagery from a variety of other sources, such as other computers, online databases, and/or the like, using any of a variety of well-known data transfer techniques.

At block 240, the method 200 might comprise producing a feature data set from the aerial imagery. As used herein, the term, "feature data," means any data that describes, with appropriate precision, features of a subject area. Such features can include terrain features, man-made structures, and/or any other geographic/topographic characteristics of the subject area. Merely by way of example, features can be represented within the software as points, lines, and/or polygons; examples of features can include things such as a fire hydrant (which might be represented by a point), the centerline of a road (which could be represented as a line), and a building footprint (which could be represented by a polygon). Features can have geometry (location, size, and shape) as well as other non-location attributes such as color, size, condition, owner, etc.). Accordingly, feature data can include imagery that is oriented according to a local or global coordinate system, point clouds, coordinate descriptions of features and subject area, and/or the like. A "feature data set," then, means any set of data that describes the features of some or all of a subject area.

In a particular aspect of some embodiments, the feature data set can be produced by analyzing the aerial imagery photogrammetrically. A variety of photogrammetric techniques are described, for example, in provisional U.S. Patent Application No. 61/710,486, filed Oct. 5, 2012 by Grässer et al. and entitled "Enhanced Position Measurement Systems and Methods," U.S. patent application Ser. No. 13/332,648, filed Dec. 21, 2011 by Grässer et al. and entitled "Enhanced Position Measurement Systems and Methods," U.S. patent application Ser. No. 13/167,733 filed Jun. 24, 2011 by Wang et al. and entitled "Method and Apparatus for Image-Based Positioning, U.S. patent application Ser. No. 12/559,322, filed Sep. 14, 2009 by Janky et al. and entitled "Image-Based Georeferencing," and U.S. patent application Ser. No. 12/350,871, filed Jan. 8, 2009 by Vogel et al. and entitled "Method and System for Measuring Angles Based on 360 Degree Images," (collectively, the Incorporated Applications), all of which are incorporated herein by reference.

For instance, a network of images that have at least a portion of overlapping coverage (captured area) can be processed to correct relative image positions and orientations. This can be done by automatically or manually finding common points between two or more images ("tie points"), which might be, but need not necessarily be, known reference points, and performing a bundle adjustment on the images to orient the images relative to one another (e.g., relative position in space and/or relative orientation in three or fewer axes). Optionally, the adjustment can include GNSS observations to a well-known location on the aircraft and/or registered ground control points (e.g., known reference points). By including either of these types of survey observations, the user can create a precise connection between the features extracted from the aerial data set and a mapping reference frame.

Such techniques (and/or any other suitable techniques) can be used to orient an aerial image photogrammetrically and/or to create a feature data set (e.g., a data set comprising position/orientation fixes and/or other feature data, as described above, for various features captured in the image). For instance, one might preposition optical targets (which can be used as ground control targets) at known reference locations in the subject area and/or in response to instructions generated by the office computer system, as described above. Based on the locations of the optical targets (or other identifiable features with known locations) in the aerial image, the position and/or orientation of the image capture device on the UAS (or other aerial system) can be determined, using "reverse photogrammetry" techniques (also known in the art as a space resection) disclosed in one or more of the Incorporated Applications. From that position and orientation information, along with the captured aerial imagery the position of any other identifiable feature captured in the image can be inferred, using other photogrammetric techniques described in the Incorporated Applications. Using similar techniques, including those described in the Incorporated Applications, multiple aerial images (e.g., successive frames in captured video, different still images, etc.) can be oriented relative to one another (based on the respective positions within each image of common features), and a feature data set comprising feature data about the entire subject area (or a desired portion thereof) can be generated.

As noted above, a benefit of some embodiments is the ability to integrate data from a plurality of feature data sets, including without limitation aerial imagery, terrestrial imagery, aerial and/or GNSS observations, and/or other terrestrial survey observations. In some embodiments, a single software package can accept all of these types of data as native data for processing in a common environment without the need for import operations, data and/or format translations, etc. This level of integration can produce significant gains in efficiency as well as enhanced accuracy in the integrated data, due to the reduction of errors and/or imprecision related to data import and the like. In accordance with different embodiments, a variety of different integration techniques are possible, depending on the data captured and the deliverables to be produced from the data (which can include, without limitation, ortho-photo mosaics, feature databases, terrain maps, virtual tours, etc.).

For instance, in some embodiments, the data might include a feature data set from one or more terrestrial survey instruments, such as those described above. Hence, at block 245, the method 200 can comprise combining a first feature data set (e.g., a feature data set obtained from aerial imagery) with a second feature data set (e.g., a feature data set comprising data obtained from one or more terrestrial survey instruments). Many techniques may be suitable for combining feature data sets in this fashion, and the combination of feature data sets can serve a variety of purposes.

Merely by way of example, in some cases, combining feature data sets can comprise fixing the position of the UAS at the point of image capture through integration of GNSS data from a ground-based receiver with GNSS data from a receiver on the UAS (e.g., using RTK techniques). Similarly, the orientation of the image capture device can be fixed using photogrammetric techniques by reference to known reference points (which can be part of a terrestrial feature data set) and/or by reference to tie points in terrestrial images.

In other cases, an aerial survey feature data set can be combined with a terrestrial data set by integrating with the aerial data set feature data from the terrestrial data set for areas that are obscured from overhead views or difficult to capture from overhead. In addition to areas with significant foliage cover or bridge overhangs, the use of terrestrial imagery and/or data can be useful to supplement aerial imagery for features that are not amenable to overhead capture. Examples include measurement of the base of a building (which can be obscured by eaves and/or the like), as well as measurement of stacked power lines, which can be difficult to discern from overhead imagery).

Taking the case of stacked power lines, for example, a UAS might capture aerial imagery by flying a flight path longitudinally over the power lines for some distance. A terrestrial surveyor might also capture terrestrial panoramic imagery along the route of the power lines with a total station or similar device, and this terrestrial imagery can be oriented based on terrestrial measurements taken while capturing the terrestrial images (or at another time), e.g., using techniques described in the Incorporated Applications. With regard to position, these fixes are reasonably precise, but the angular orientation is generally not terribly precise (and might be, for instance, limited to the level of precision of a compass on the total station). Conventional back sighting techniques (or others) can be used to orient these images more precisely, but these techniques can be time consuming and/or can require significant additional terrestrial measurements. On the other hand, the rough orientation provided by the compass on the total station can be sufficient to provide starting point for a bundle adjustment using the terrestrial panoramic images and the aerial images. Thus, the aerial imagery, although perhaps not terribly useful to measure the power lines themselves, can be used to orient the terrestrial images, which then can be used to measure the power lines. This functionality is enabled, in various embodiments, by the ability of the processing software to treat the aerial imagery and the terrestrial imagery as similar data in a common environment, as described above.

To illustrate some more examples of integration of feature data sets, FIG. 3 depicts a method 300 of combining feature data sets. In some cases, for instance, the terrestrial survey instrument(s) might include cameras or other imaging systems capable of capturing panoramic imagery (e.g., from ground level) of the subject area. Examples of such terrestrial survey instruments are described in the Incorporated Applications. The method 300, then, can include collecting panoramic imagery with such a panoramic imagery system (block 305). This panoramic imagery can be analyzed photogrammetrically (block 310), for example as described above with regard to the aerial imagery. This analysis can produce a second feature data set from the data (in this case, panoramic imagery) collected by the terrestrial survey instrument.

In other cases, the terrestrial survey instrument(s) might produce feature data that does not require photogrammetric analysis. For example, a total station, GNSS device, laser device (such as a three-dimensional laser scanner, EDM system, etc.) might provide position data for various features in the subject area, and a feature data set could be generated from this ground-based survey data. In fact, one technique for combining feature data sets is to use ground-based survey data to infer positions of the reference points in the aerial imagery, which then can provide those inferred positions as known reference positions to allow for photogrammetric analysis of those images, as described above.

For instance, the method 300 might comprise identifying, in a feature data set generated from data collected by a terrestrial survey instrument, one or more tie points (block 315). These tie points might be identified by description and/or by position. Merely by way of example, an optical target might be identified as "Target 1" and assigned a position defined by latitude/longitude/elevation values. A particular feature might be identified as "Building—NW corner" and assigned a position. These positions might be determined by terrestrial survey techniques (e.g., azimuth/distance from a known measurement location, GNSS fix, etc.) by photogrammetric analysis of panoramic imagery, and/or the like. In a particular aspect, each of these tie points might be assigned a position in a reference coordinate system (which might be, as noted above, a global latitude/longitude/elevation coordinate system or any other appropriate local or global coordinate system).

The method 300 might further comprise, identifying, in one or more aerial images, locations of each of the identified tie points. The locations in the images might be expressed, for example, as (X,Y) pixel coordinates from an origin in the image, which might be the top-left corner of the image, the center of the image, etc. These locations (e.g., pixel coordinates) can then be correlated to the corresponding known position of the tie points in the reference coordinate system (block 320), which associates a particular pixel coordinate in the aerial image with a known position in the reference coordinate system. Using, e.g., the photogrammetric techniques disclosed in the Incorporated Applications, then, the aerial image can be oriented based on the correlated pixel coordinates of the tie points (block 325). The orientation of the aerial image can establish the position of the image capture device that too the image as well as the three-axis orientation of the field of view that image capture device. Once the aerial image has been oriented, as noted above, the position of any feature in the image can be determined photogrammetrically.

Two or more feature data sets can be combined in other ways as well, however. Merely by way of example, one feature data set might comprise oriented aerial imagery and another feature data set might comprise oriented panoramic imagery (taken from ground level), and based on the orientation of each of the aerial and panoramic imagery, respectively, the feature data sets could be combined to correlate the orientation of each of images (which can provide enhanced functionality for presenting the imagery to a user, as described in further detail below, for example). For example, with reference to FIG. 3A, the aerial imagery could be used to generate an aerial ortho-mosaic image (block 330) (e.g., from multiple aerial images that have been oriented photogrammetrically with respect to one another) and then correlate one or more panoramic images with the aerial ortho-mosaic image (block 335) (e.g., based on respective pixel-coordinates of features captured in each of the images and/or based on the inferred orientations of the image capture devices that captured each of the respective images). Further, once the aerial and terrestrial images are positioned and/or oriented, a user can measure individual features using the combination of aerial and terrestrial imagery. For instance, the user can precisely measure the 3D locations of points by intersecting light rays captured by (1) a terrestrial panoramic system and (2) an aerial imaging system. For example, as noted above, complex objects such as multi-layer power lines can be efficiently and precisely mapped with a combination of aerial and terrestrial imaging.

Figure 3A:
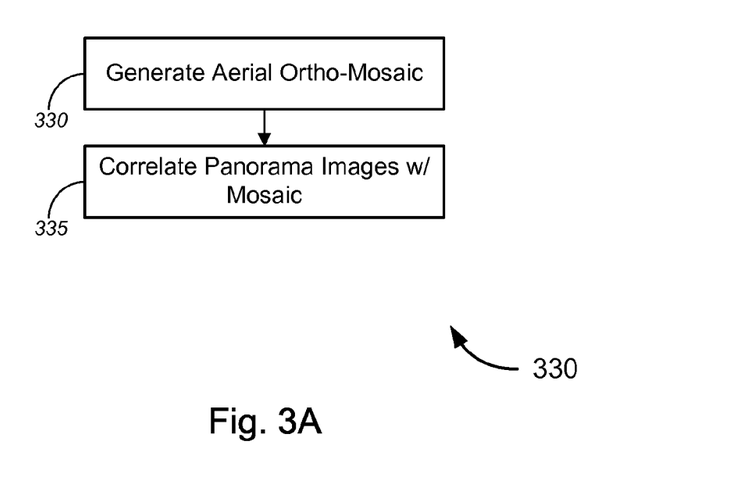

As another example of combining multiple feature data sets, some embodiments might generate a point cloud, which can serve as a first feature data set, from the photogrammetric analysis of an aerial image (or an aerial mosaic). The point cloud might describe, as a plurality of points, each feature of a subject area. Similarly, the system might generate a point cloud from other data (e.g. panoramic photos, measurements from terrestrial survey instruments, etc.), which can serve as a second data set. These two point clouds can be integrated (as each point in each cloud is defined as a point in three-dimensional space), and the integrated point cloud can serve as a combined data set. This technique might be useful, for example, to allow terrestrial survey measurements to orient an aerial image (by correlating the points in each cloud for a common feature, for example) and/or to fill "gaps" in aerial coverage with terrestrial survey measurements. Moreover, it should be noted that many of these techniques can be combined; for example, the generation of an integrated point cloud can be used to orient an aerial image (as noted above), and/or terrestrial survey measurements can be used to orient both a panoramic image and an aerial image, etc.

Returning to FIG. 2, the method 200 can include, at block 250, generating a land survey from a feature data set (which might include feature data generated from aerial data and/or might comprise a combined data set include feature data obtained, e.g., from terrestrial survey instruments). As noted above, aerial imagery (and/or other feature data) might be captured about a particular subject area, and the land survey might cover at least a portion of that subject area. As used herein, a "land survey" means a formatted representation of material features of a subject area, which can include (without limitation) the terrain, manmade objects, and land ownership information, that has sufficient accuracy and precision to allow the representation to serve as a guide for desired activities, which can include, without limitation, land-use planning, scientific studies, construction, and/or the like. As one skilled in the art will appreciate, conventional survey techniques employ the position measurement of all material features of a survey site and the generation of a survey therefrom. Using aerial photography and the photogrammetric techniques described above and in the Incorporated Applications, various embodiments can fix positions of material features in the subject area with sufficient precision to allow generation of a land survey—in other words, the feature data set generated from the aerial imagery can substitute for some or all of the measurements that conventionally would be performed by terrestrial survey instruments. (Of course, as necessary, this feature data set can be combined with additional feature data sets obtained by terrestrial surveying methods, as noted above, to provide feature data about a portion of the subject area obscured from the UAS and/or un-captured in the aerial imagery, to provide orientation of the imagery, etc. Even in this case, however, the use of aerial imagery can dramatically reduce the number of terrestrial survey measurements required for proper coverage of the subject area.)

Certain embodiments might provide additional functionality. Merely by way of example, in some cases, the method 200 might include generating a terrain map from the land survey (block 255). A terrain map might show features of interest and any other characteristics of the survey area, such as topographical lines, that might be desired and can be inferred from photogrammetric analysis of the aerial photography (and/or supplemented as necessary by terrestrial survey measurements). As another example, integrated aerial survey data can be used for agricultural studies and planning. For instance, a farmer could use the imagery to count trees in an orchard, determine which trees are growing well/poorly, and adjust planting, watering, fertilizer, pesticides and/or other variables accordingly. Similarly, an airport could use the combination of aerial and terrestrial photography to study glide paths into precision approaches and provide analysis for building permitting and tree-cutting. In an open-pit mine, for instance, the integrated application might be used daily to study the volume of materials removed and/or safety of wall slopes. From these examples, one skilled in the art can appreciate that integrated aerial surveys provided by various embodiments can be useful in many different fields and applications.

Returning to FIG. 2, the method 200 might comprise presenting, at block 260, the aerial imagery and/or ground-level panoramic imagery to a user (e.g., via the user interface of an office computer system, etc.). For instance, as described above, the system might generate an aerial ortho-image mosaic from the aerial imagery and/or correlate one or more panoramic images with the aerial ortho-image mosaic (or other aerial imagery). The method 200, then, might include presenting, e.g., in the user interface, the collected aerial imagery using a plan view (block 260) and/or receiving user input to zoom into an area of focus on the plan view (block 265). The method 200 might further include presenting, in the user interface, one or more panoramic images corresponding to the area of focus (block 270). These panoramic images could correspond to the area of focus identified by the user input. A variety of different presentation techniques might be used to present this imagery.

Figure 2B:
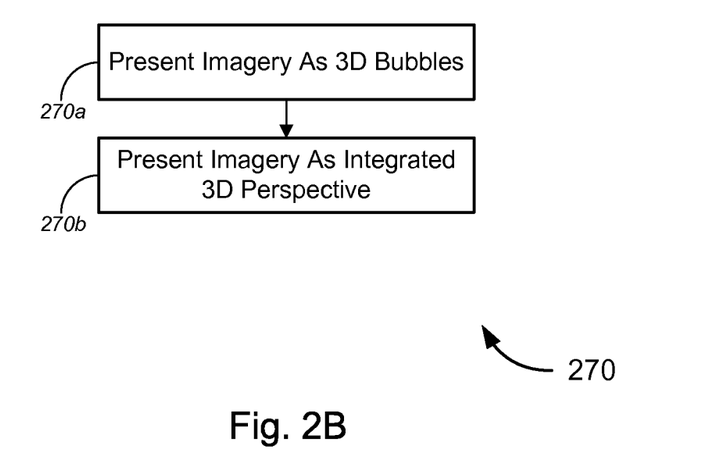

Merely by way of example, by reference to FIG. 2B, the panoramic imagery might be presented as three dimensional panorama bubbles corresponding to the area of focus (block 270a). In such an implementation, the user might be presented with an aerial (overhead) view of the subject area, and when the user selects (e.g., clicks on) a particular portion of that image, the system might display panoramic images captured from the ground position that corresponds to that portion of the aerial image (or as close to that position as possible). Alternatively and/or additionally, the aerial imagery and the panoramic imagery might be presented as integrated in a three-dimensional perspective (block 270b). As an example, the combined aerial and terrestrial imagery can be used to create an engineering-grade "virtual tour" of a location, in which views from a variety of angles (including, in some cases, a continuous spectrum of angles) from overhead to human-perspective are available for visualization and measuring. This functionality is a result of the realization that, at a certain level of abstraction, a UAS can perform as a flying total station that is working in an angles-only mode; in this role, the UAS can collect many features/observations at once. As such the same techniques that display and manipulate traditional survey data (e.g. collected by a total station) can also be used with UAS-collected imagery and/or data (including without limitation data derived from such imagery).

As an additional or alternative feature, the method 200 might comprise tracking historical features of the subject area (block 275). For example, the system might generate a plurality of land surveys at different times over a period of days, weeks, months, or years, and historical features of the subject area might be tracked based on this plurality of land surveys. These surveys (and/or, more particularly, the overhead images associated with each survey) could be presented to the user in the manner of time lapse photography, allowing the user to see, over time, how the subject area has developed. Because the images are associated with land surveys, detailed feature data would be available for different points in time, and this feature data could be analyzed to determine, for example, a degree of erosion of a shoreline, growth of a mine tailings pile, and/or the like. Similarly, for construction sites, the locations of buried utilities or simply the location of construction equipment can be re-created at a later date.

Figure 4:
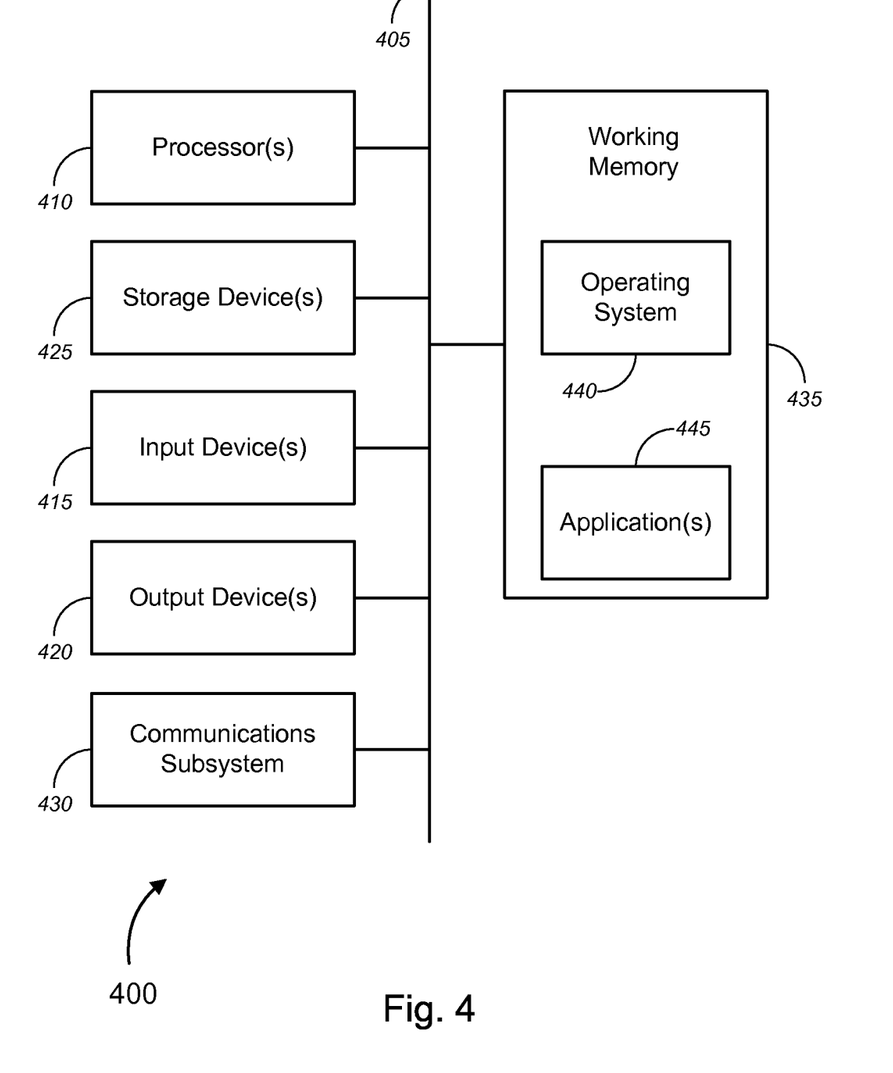
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a ground-based control system for a UAS, an office computer system, an integrated office/control system, and/or an onboard computer/control system on the UAS itself, which could function to receive and store control information, operate the imaging system, communicate images to a ground-based system, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   operating an unmanned aerial system;
   collecting, with the unmanned aerial system, aerial imagery of a subject area; and
   receiving, at a computer, the aerial imagery collected by the unmanned aerial system;
   producing, at the computer, a first feature data set by analyzing the aerial imagery photogrammetrically;
   combining the first feature data set with a second feature data set to produce a combined feature data set, the second feature data set comprising data collected by one or more terrestrial survey instruments; and
   generating, at the computer, a land survey of at least a portion of the subject areas, based at least in part on the combined feature data set.

2. The method of claim 1, wherein combining the first feature data set with a second feature data set comprises:
   identifying one or more tie points in the second feature data set, each of the one or more tie points having a known position in a reference coordinate system;
   identifying a pixel coordinate, in the aerial imagery, of each of the one or more tie points;
   correlating each pixel coordinate of one of the tie points in the aerial imagery with a corresponding known position on the reference coordinate system; and
   orienting the aerial imagery based on the correlated pixel coordinate of each of the one or more tie points.

3. The method of claim 1, wherein the one or more terrestrial survey instruments comprises a panoramic imagery system, and wherein the method further comprises:
   collecting panoramic imagery with the panoramic imagery system; and
   generating the second feature data set by analyzing the panoramic imagery photogrammetrically.

4. The method of claim 3, further comprising:
   generating an aerial ortho-image mosaic from the aerial imagery; and
   correlating one or more panoramic images with the aerial ortho-image mosaic.

5. The method of claim 4, further comprising:
   presenting, in a user interface, the aerial imagery using a plan view;
   receiving user input to zoom into an area of focus on the plan view; and
   presenting, in the user interface, one or more panoramic images as three dimensional panorama bubbles corresponding to the area of focus.

6. The method of claim 4, further comprising:
   presenting, in a user interface, the aerial imagery and the panoramic imagery integrated in a three-dimensional perspective.

7. The method of claim 1, wherein collecting aerial imagery comprises collecting aerial imagery from an altitude of between 100 feet and 800 feet above ground level.

8. The method of claim 1, wherein collecting aerial imagery comprises collecting aerial imagery from an altitude of between 300 feet and 600 feet above ground level.

9. The method of claim 1, wherein collecting aerial imagery comprises capturing digital stereo imagery with the unmanned aerial system.

10. The method of claim 1, further comprising:
    planning, with a computer, a flight path for the unmanned aerial system; and
    directing, with the computer, placement of ground control targets corresponding to the flight path.

11. The method of claim 1, wherein producing the first feature data set comprises generating a first point cloud from the aerial imagery, producing the second feature data set comprises generating a second point cloud from the data collected by one or more terrestrial survey instruments, and the combined data set comprises an integrated point cloud generated from the first point cloud and the second point cloud.

12. The method of claim 1, further comprising:
    tracking historical features of the subject area, based on a plurality of land surveys generated at different times.

13. The method of claim 1, wherein the second feature data set comprises feature data about a portion of the subject area obscured from the unmanned aerial system and un-captured in the aerial imagery.

14. The method of claim 1, further comprising:
    generating, with the computer, a terrain map from the land survey.

15. A system, comprising:
    an unmanned aerial system comprising an imaging system configured to capture aerial imagery of a subject area; and
    a computer comprising a processor and non-transitory computer readable medium having encoded thereon a set of instructions executable by the processor to:
      receive the aerial imagery from the unmanned aerial system;
      produce a first feature data set by analyzing the aerial imagery photogrammetrically;
      combine the first feature data set with a second feature data set to produce a combined feature data set, the second feature data set comprising data collected by one or more terrestrial survey instruments; and
      generate a land survey of at least a portion of the subject areas, based at least in part on the combined feature data set.

16. The system of claim 15, wherein the imaging system comprises a plurality of imaging devices configured to capture digital stereo imagery of the subject area.

17. The system of claim 15, further comprising:
    a terrestrial survey instrument configured to collect the data to produce the second feature data set.

18. The system of claim 17, wherein the terrestrial survey instrument comprises a total station.

19. The system of claim 17, wherein the terrestrial survey instrument comprises a panoramic camera.

20. The system of claim 17, wherein the terrestrial survey instrument comprises a laser scanning system.

21. The system of claim 17, wherein the terrestrial survey instrument comprises a global navigation satellite system ("GNSS") receiver.

22. An apparatus, comprising:
    a computer readable medium having encoded thereon a set of instructions executable by one or more computers to:
      receive aerial imagery collected by an unmanned aerial system;
      produce a first feature data set by analyzing the aerial imagery photogrammetrically;
      combine the first feature data set with a second feature data set to produce a combined feature data set, the second feature data set comprising data collected by one or more terrestrial survey instruments; and
      generate a land survey of at least a portion of the subject areas, based at least in part on the combined feature data set.

23. A computer system, comprising:
one or more processors; and
a computer readable medium in communication with the one or more processors, the computer readable medium having encoded thereon a set of instructions executable by the computer system to:
 receive aerial imagery collected by an unmanned aerial system;
 produce a first feature data set by analyzing the aerial imagery photogrammetrically;
 combine the first feature data set with a second feature data set to produce a combined feature data set, the second feature data set comprising data collected by one or more terrestrial survey instruments; and
 generate a land survey of at least a portion of the subject areas, based at least in part on the combined feature data set.

* * * * *